US011301687B2

(12) United States Patent
Chen et al.

(10) Patent No.: US 11,301,687 B2
(45) Date of Patent: Apr. 12, 2022

(54) PEDESTRIAN RE-IDENTIFICATION METHODS AND APPARATUSES, ELECTRONIC DEVICES, AND STORAGE MEDIA

(71) Applicant: BEIJING SENSETIME TECHNOLOGY DEVELOPMENT CO., LTD., Beijing (CN)

(72) Inventors: Dapeng Chen, Beijing (CN); Hongsheng Li, Beijing (CN); Tong Xiao, Beijing (CN); Shuai Yi, Beijing (CN); Xiaogang Wang, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 147 days.

(21) Appl. No.: 16/726,878

(22) Filed: Dec. 25, 2019

(65) Prior Publication Data

US 2020/0134321 A1 Apr. 30, 2020

Related U.S. Application Data

(63) Continuation of application No. PCT/CN2018/116600, filed on Nov. 21, 2018.

(30) Foreign Application Priority Data

Feb. 12, 2018 (CN) .......................... 201810145717.3

(51) Int. Cl.
*G06K 9/00* (2006.01)
(52) U.S. Cl.
CPC ..... *G06K 9/00758* (2013.01); *G06K 9/00369* (2013.01); *G06K 9/00744* (2013.01); *G06K 9/00771* (2013.01)

(58) Field of Classification Search
CPC .......... G06K 9/00288; G06K 9/00771; G06K 9/00624; G06K 9/00758
See application file for complete search history.

(56) References Cited

U.S. PATENT DOCUMENTS

| 2013/0058579 A1* | 3/2013 | Kawanishi ............ G06F 16/583 |
| | | 382/195 |
| 2015/0131858 A1 | 5/2015 | Nakayama |
| 2018/0157939 A1* | 6/2018 | Butt ..................... H04N 21/466 |

FOREIGN PATENT DOCUMENTS

| CA | 2351230 C | 6/2010 |
| CN | 103810476 A | 5/2014 |

(Continued)

OTHER PUBLICATIONS

Sun et al., "Ranking Domain-specific Highlights by Analyzing Edited Videos", ECCV 2014: Computer Vision—ECCV 2014 pp. 787-802 (Year: 2014).*

(Continued)

*Primary Examiner* — Kenny A Cese
(74) *Attorney, Agent, or Firm* — Syncoda LLC; Feng Ma (57) ABSTRACT

A pedestrian re-identification method includes: obtaining a target video containing a target pedestrian and at least one candidate video; encoding each target video segment in the target video and each candidate video segment in the at least one candidate segment separately; determining a score of similarity between the each target video segment and the each candidate video segment according to encoding results, the score of similarity being used for representing a degree of similarity between pedestrian features in the target video segment and the candidate video segment; and performing pedestrian re-identification on the at least one candidate video according to the score of similarity.

18 Claims, 8 Drawing Sheets

(56) References Cited

FOREIGN PATENT DOCUMENTS

| | | |
|---|---|---|
| CN | 105095475 A | 11/2015 |
| CN | 105354548 A | 2/2016 |
| CN | 105518744 A | 4/2016 |
| CN | 106022220 A | 10/2016 |
| CN | 107346409 A | 11/2017 |
| CN | 108399381 A | 8/2018 |
| JP | 2017167970 A | 9/2017 |
| JP | 2017182437 A | 10/2017 |
| KR | 20140090795 A | 7/2014 |

OTHER PUBLICATIONS

First Office Action of the Japanese application No. 2019-570048, dated Mar. 2, 2021.
English translation of the Written Opinion of the International Search Authority in the international application No. PCT/CN2018/116600, dated Feb. 21, 2019.
Hyunguk Choi, Moongu Jeon "Data association for Non-overlapping Multi-camera Multi-object tracking based on Similarity function", The School of Electrical Engineering and Computer Science, 2016 IEEE International Conference on Consumer Electronics—Asia (ICCE—Asia), Oct.26, 2016.
First Office Action of the Korean application No. 10-2019-7038764, dated Nov. 30, 2020.
Taiqing Wang et al. "Person Re-Identification by Video Ranking", European Conference on Computer Vision, issued on Sep. 30, 2014, section 3.
Zhedong Zheng et al. "A Discriminatively Learned CNN Embedding for Person Re-identification", arXiv, issued on Feb. 3, 2017, section III-D.
Yi Xie, "Research on Person Re-identification for Intelligent Video Surveillance", Issue 11, Full text database of doctoral dissertations in China, issued on Nov. 15, 2017, pp. 1136-1175.
Lin Wu et al. "Convolutional LSTM Networks for Video-based Person Re-identification", arXiv, issued on Jun. 6, 2016, pp. 1-15.
Kan Liu, "Research on Spatio-Temporal Appearance Representation for Video-Based Person Re-identification", Issue 2, Full text database of Chinese excellent master's dissertations, issued on Feb. 15, 2017, pp. I138-3135.
Dapeng Chen et al. "Video Person Re-identification with Competitive Snippet-similarity Aggregation and Co-attentive Snippet Embedding", 2018 IEEE/CVF Conference on Computer Vision, issued on Jun. 1, 2018.
International Search Report in the international application No. PCT/CN2018/116600, dated Feb. 21, 2019.
First Office Action of the Chinese application No. 201810145717.3, dated Mar. 26, 2020.

\* cited by examiner

PEDESTRIAN RE-IDENTIFICATION METHODS AND APPARATUSES, ELECTRONIC DEVICES, AND STORAGE MEDIA

CROSS-REFERENCE TO RELATED APPLICATIONS

The present disclosure is a U.S. continuation application of International Application No. PCT/CN2018/116600, filed on Nov. 21, 2018, which claims priority to Chinese Patent Application No. 201810145717.3 and filed on Feb. 12, 2018. The disclosures of these applications are incorporated herein by reference in their entirety.

BACKGROUND

Pedestrian re-identification is a key technology in an intelligent video surveillance system, and it aims to find a candidate video from a great amount of candidate videos containing a same pedestrian as a target video by measuring similarities between the given target video and the candidate videos.

SUMMARY

Embodiments of the present disclosure provide technical solutions for pedestrian re-identification.

According to a first aspect of the embodiments of the present disclosure, provided is a pedestrian re-identification method, including: obtaining at least one candidate video and a target video containing a target pedestrian; encoding each target video segment in the target video and each candidate video segment in the at least one candidate segment respectively; determining, according to encoding results, a score of similarity between the each target video segment and the each candidate video segment, the score of similarity being used for representing a degree of similarity between pedestrian features in the target video segment and pedestrian features in the candidate video segment; and performing, according to the score of similarity, pedestrian re-identification on the at least one candidate video.

According to a second aspect of the embodiments of the present disclosure, provided is a pedestrian re-identification apparatus, including: an obtaining module, configured to obtain at least one candidate video and a target video containing a target pedestrian; an encoding module, configured to encode each target video segment in the target video and each candidate video segment in the at least one candidate segment respectively; a determining module, configured to determine, according to encoding results, a score of similarity between the each target video segment and the each candidate video segment, the score of similarity being used for representing a degree of similarity between pedestrian features in the target video segment and pedestrian features in the candidate video segment; and an identifying module, configured to perform, according to the score of similarity, pedestrian re-identification on the at least one candidate video.

According to a third aspect of the embodiments of the present disclosure, provided is an electronic device, including: a processor and a memory for storing instructions executable by the processor, where execution of the instructions by the processor causes the processor to perform the pedestrian re-identification method according to the first aspect.

According to a fourth aspect of the embodiments of the present disclosure, provided is a non-transitory computer-readable storage medium, configured to store computer-readable instructions, wherein execution of the instructions by the processor causes the processor to perform the pedestrian re-identification method according to the first aspect.

According to a fifth aspect of the embodiments of the present disclosure, provided is a computer program product, including at least one executable instruction, where when the executable instruction is executed, the pedestrian re-identification method according to the first aspect is implemented.

DETAILED DESCRIPTION

A current pedestrian re-identification method mainly encodes a complete video, and measures the similarities between the entire target video and the entire candidate video by using an encoding result. The effect of pedestrian re-identification is poor.

According to the embodiments of the present disclosure, during pedestrian re-identification, a target video containing a target pedestrian and at least one candidate video are obtained; each target video segment in the target video and each candidate video segment in the at least one candidate segment are separately encoded; a score of similarity between the each target video segment and the each candidate video segment is determined according to encoding results; and pedestrian re-identification is performed on the at least one candidate video according to the score of similarity. A number of frames contained in a video segment are far less than a number of frames contained in an entire video, and therefore, a degree of change of pedestrian surface information in the video segment is far lower than a degree of change of pedestrian surface information in the entire video. Compared with encoding of an entire target video and an entire candidate video, encoding of each target video segment and each candidate video segment effectively reduces changes of pedestrian surface information, and a diversity of pedestrian surface information in different video frames and a dynamic correlation between a video frame and a video frame are used, so as to improve a utilization rate of the pedestrian surface information, and improve an accuracy rate of calculation of a score of similarity between the each target video segment and the each candidate video segment according to encoding results, thereby improving an accuracy rate of pedestrian re-identification.

The specific implementations of the embodiments of the present invention are further described in detail below with reference to the accompanying drawings (the same reference numerals in a plurality of accompanying drawings represent the same elements) and the embodiments. The following embodiments are intended to illustrate the present invention, but are not intended to limit the scope of the present invention.

A person skilled in the art may understand that the terms such as "first" and "second" in the embodiments of the present invention are only used to distinguish different operations, devices or modules, etc., and do not represent any specific technical meaning or an inevitable logical sequence therebetween.

Figure 1:
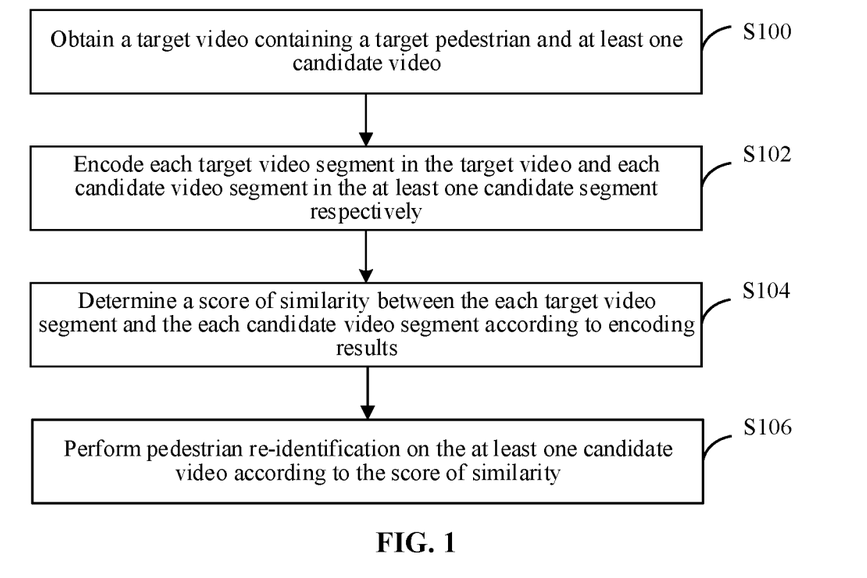
FIG. 1 is a schematic flowchart according to one or more embodiments of a pedestrian re-identification method according to embodiments of the present disclosure.

Referring to FIG. 1, a schematic flowchart of one embodiment of a pedestrian re-identification method according to embodiments of the present disclosure is shown.

The pedestrian re-identification method according to the embodiments of the present disclosure invokes, by means of a processor of an electronic device, related instructions stored in a memory to perform the operations below.

Operation S100, a target video containing a target pedestrian and at least one candidate video are obtained.

The target video in the embodiments of the present disclosure contains one or more target pedestrians, and the candidate video contains one or more candidate pedestrians or does not contain a candidate pedestrian. The target video and the at least one candidate video in the embodiments of the present disclosure is a video image from a video acquisition device or from other devices. One purpose of the embodiments of the present disclosure is obtaining from at least one candidate video a candidate video in which a candidate pedestrian and a target pedestrian are a same pedestrian.

In an optional example, operation S100 is performed by a processor by invoking a corresponding instruction stored in a memory, or is performed by an obtaining module 50 run by the processor.

Operation S102, each target video segment in the target video and each candidate video segment in the at least one candidate segment are separately encoded.

First, the target video and the candidate video are segmented to generate each target video segment in the target video and each candidate video segment in the candidate segment, where the each target video segment has a fixed time length, each candidate video segment has a fixed time length, and the time length of the each target video segment and the time length of the each candidate video segment are same or different.

Then, an encoding operation is separately performed on the each target video segment and the each candidate video segment, to obtain an encoding result of the each target video segment and an encoding result of the each candidate video segment.

In an optional example, operation S102 is performed by a processor by invoking a corresponding instruction stored in a memory, or is performed by an encoding module 52 run by the processor.

Operation S104, a score of similarity between the each target video segment and the each candidate video segment is determined according to encoding results.

In the embodiments of the present disclosure, the encoding result of the each target video segment may be considered to be one form of expression of a pedestrian feature vector in the each target video segment, and the encoding result of the each candidate video segment may be considered to be one form of expression of a pedestrian feature vector in the each candidate video segment.

Alternatively, the encoding result is a pedestrian feature vector. If a pedestrian feature vector of a certain target video segment and a pedestrian feature vector of a certain candidate video segment are same or approximate, it is indicated that a possibility that the target video segment and the candidate video segment contain a same target pedestrian is high; and if a pedestrian feature vector of a certain target video segment and a pedestrian feature vector of a certain candidate video segment are different, it is indicated that a possibility that the target video segment and the candidate video segment contain a same target pedestrian is low, i.e., a score of similarity between the target video segment and the candidate video segment is low.

In an optional example, operation S104 is performed by a processor by invoking a corresponding instruction stored in a memory, or is performed by a determining module 54 run by the processor.

Operation S106, pedestrian re-identification is performed on the at least one candidate video according to the score of similarity.

After the score of similarity between the each target video segment and the each candidate video segment is obtained, a score of similarity of the at least one candidate video may be obtained according to the score of similarity. A candidate video with a high score of similarity is determined as a candidate video in the target video having a same target pedestrian.

In an optional example, operation S106 is performed by a processor by invoking a corresponding instruction stored in a memory, or is performed by an identifying module 56 run by the processor.

Figure 2:
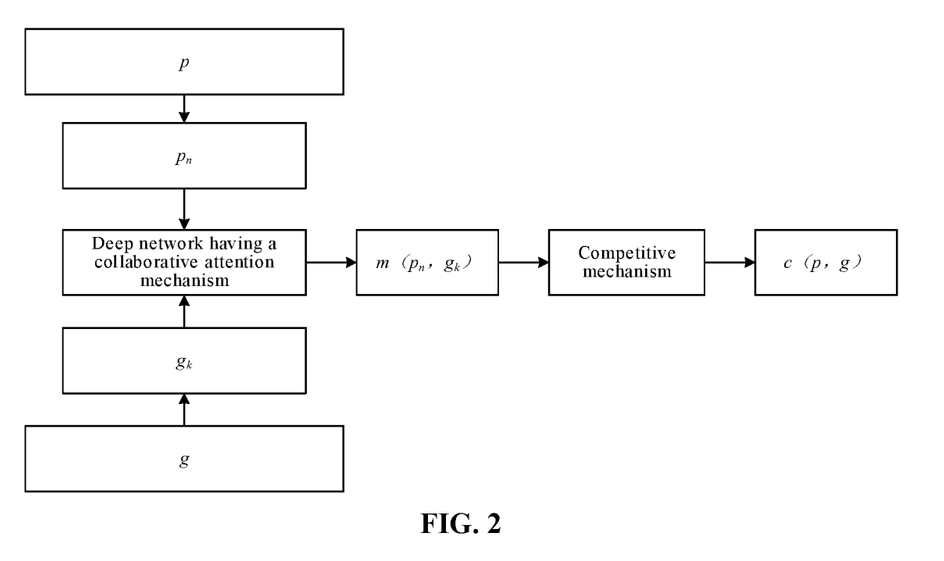
FIG. 2 is a schematic calculation framework diagram according to one or more embodiments of a pedestrian re-identification method according to embodiments of the present disclosure.

The pedestrian re-identification method provided in the embodiments of the present disclosure may be performed under the calculation framework as shown in FIG. 2. First, a video (including a target video and at least one candidate video) is segmented to generate video segments having a fixed length. p represents the target video, g represents one candidate video in the at least one candidate video, $p_n$ is one target video segment in the target video p, and $g_k$ is one candidate video segment in the candidate video g. In order to measure a similarity between any two video segments in the target video p and the candidate video g, a deep network having a collaborative attention mechanism is used. The deep network uses the target video segment $p_n$ and the candidate video segment $g_k$ as inputs, and an output $m(p_n, g_k)$ as a score of similarity between the target video segment $p_n$ and the candidate video segment $g_k$. For every two video segments (a target video segment and a candidate video segment) in the target video p and the candidate video g, scores of similarity between several video segments may be obtained. In order to effectively estimate the similarity between the target video p and the candidate video g, some of scores of similarity with a high similarity may be selected by using a competitive mechanism, and these scores of similarity are added to obtain an reliable estimate c(p,g) of the similarity between the target video p and the candidate video g.

According to the embodiments of the present disclosure, during pedestrian re-identification, a target video containing a target pedestrian and at least one candidate video are obtained; each target video segment in the target video and each candidate video segment in the at least one candidate segment are separately encoded; a score of similarity between the each target video segment and the each candidate video segment is determined according to encoding results; and pedestrian re-identification is performed on the at least one candidate video according to the score of similarity. A number of frames contained in a video segment are far less than a number of frames contained in an entire video, and therefore, a degree of change of pedestrian surface information in the video segment is far lower than a degree of change of pedestrian surface information in the entire video. Compared with encoding of an entire target video and an entire candidate video, encoding of each target video segment and each candidate video segment effectively reduces changes of pedestrian surface information, and a diversity of pedestrian surface information in different video frames and a dynamic correlation between a video frame and a video frame are used, so as to improve a utilization rate of the pedestrian surface information, and improve an accuracy rate of calculation of a score of similarity between the each target video segment and the each candidate video segment according to encoding results, thereby improving an accuracy rate of pedestrian re-identification.

Figure 3:
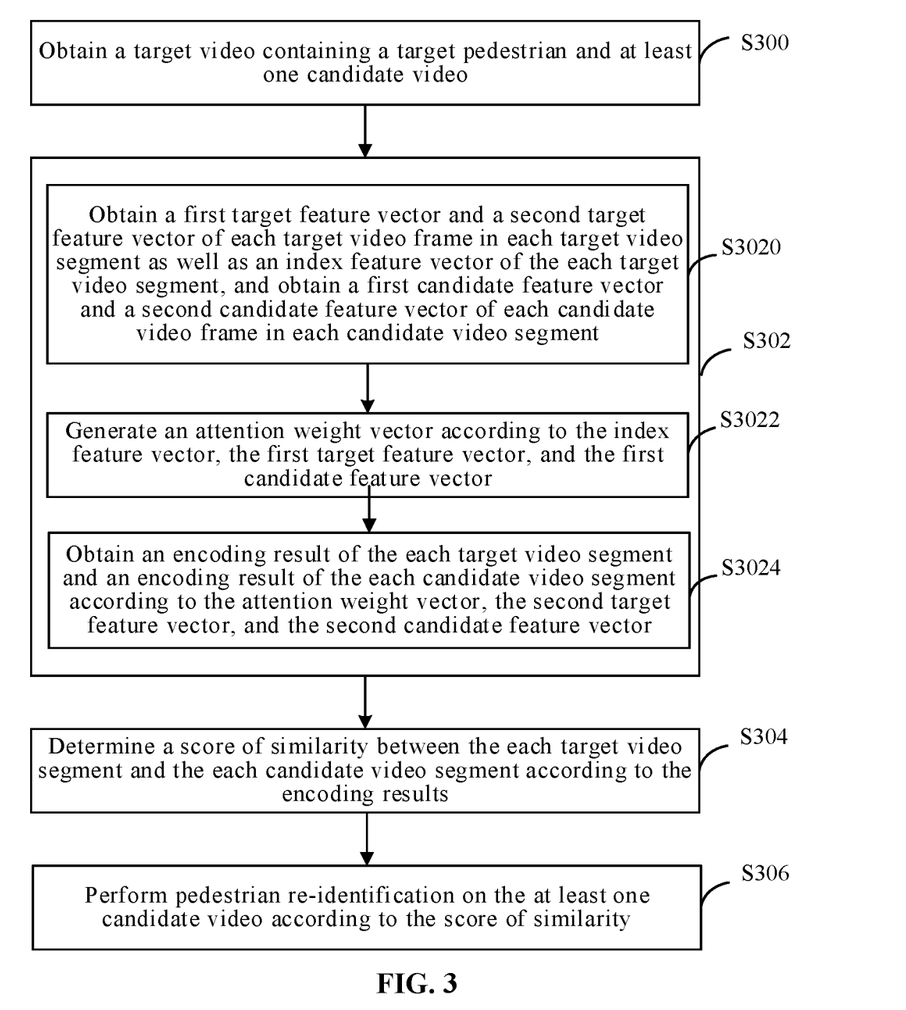
FIG. 3 is a schematic flowchart according to one or more embodiments of a pedestrian re-identification method according to embodiments of the present disclosure.

Referring to FIG. 3, a schematic flowchart of another embodiment of a pedestrian re-identification method according to embodiments of the present disclosure is shown.

It should be noted that description portions of the embodiments of the present disclosure all have their own focuses, and for details that are not described exhaustively in one embodiment, refer to the introduction and description in other embodiments in the present disclosure. Details are not described repeatedly.

Operation S300, a target video containing a target pedestrian and at least one candidate video are obtained.

Operation S302, each target video segment in the target video and each candidate video segment in the at least one candidate segment are separately encoded.

Optionally, operation S302 may include the following operations.

Operation S3020, a first target feature vector and a second target feature vector of each target video frame in the each target video segment as well as an index feature vector of the each target video segment are obtained, and a first candidate feature vector and a second candidate feature vector of each candidate video frame in the each candidate video segment are obtained.

In an optional implementation, an image feature vector of the each target video frame and an image feature vector of the each candidate video frame separately may be extracted by using a neural network, where the image feature vector is used for reflecting an image feature in the video frame, such as a pedestrian feature and a background feature. For the target video frame, a first target feature vector and a second target feature vector of each target video frame in the each target video segment as well as an index feature vector of the each target video segment are generated according to the image feature vector of the each target video frame, where the index feature vector contains information of the target video segment, and useful information can be effectively distinguished from noise information. For the candidate video frame, a first candidate feature vector and a second candidate feature vector of each candidate video frame are generated according to the image feature vector of the each candidate video frame. Specifically, a first target feature vector (a "key" feature vector) and a first candidate feature vector (a "key" feature vector) may be generated according to a linear transformation of each frame of feature, a second target feature vector (a "value" feature vector) and a second candidate feature vector (a "value" feature vector) may be generated according to another linear transformation of the each frame of feature, and an index feature vector of the each target video segment is generated by using a Long Short-Term Memory (LSTM) network and the image feature vector of the each target video frame of the each target video segment, where the index feature vector is generated by the target video segment, and used for the target video segment itself and all candidate video segments.

Operation S3022, an attention weight vector is generated according to the index feature vector, the first target feature vector, and the first candidate feature vector.

In the embodiments of the present disclosure, the first target feature vector and the first candidate feature vector are used for generating an attention weight vector. The attention weight vector comprises a target attention weight vector and a candidate attention weight vector. In an optional implementation, for the target video frame, referring to operation S30221 of FIG. 8, a target attention weight vector of the each target video frame may be generated according to the index feature vector and the first target feature vector. Optionally, referring to operation S302211 of FIG. 9, a target heat map of the each target video frame is generated according to the index feature vector and the first target feature vector of the each target video frame, specifically, an inner product operation is performed according to the index feature vector and the first target feature vector of the each target video frame to obtain a target heat map of the each target video frame; and referring to operation S302212 of FIG. 9, normalization processing is performed on the target heat map in time dimension by using a softmax function to obtain a target attention weight vector of the each target video frame. For the candidate video frame, referring to operation S30222 of FIG. 8, a candidate attention weight vector of the each candidate video frame may be generated according to the index feature vector and the first candidate feature vector. Optionally, referring to operation S302221 of FIG. 10, a candidate heat map of the each candidate video frame is generated according to the index feature vector and the first candidate feature vector of the each candidate video frame, specifically, an inner product operation is performed according to the index feature vector and the first candidate feature vector of the each candidate video frame to obtain a candidate heat map of the each candidate video frame; and referring to operation S302222 of FIG. 10, normalization processing is performed on the candidate heat map in time dimension by using a softmax function to obtain a candidate attention weight vector of the each candidate video frame.

Figure 8:
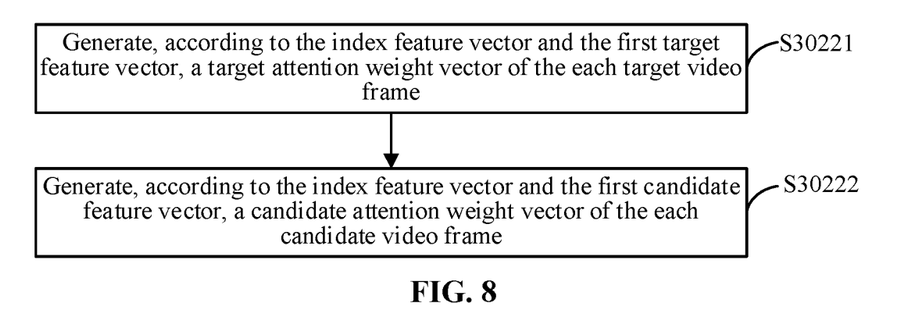
FIG. 8 is a schematic flowchart according to one or more embodiments of a pedestrian re-identification method according to embodiments of the present disclosure.
Figure 9:
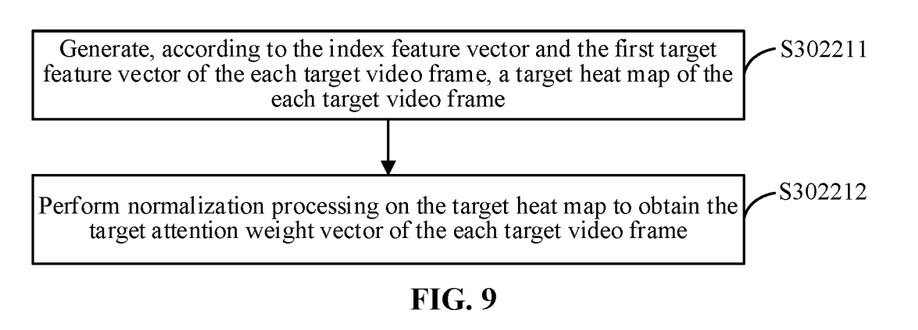
FIG. 9 is a schematic flowchart according to one or more embodiments of a pedestrian re-identification method according to embodiments of the present disclosure.
Figure 10:
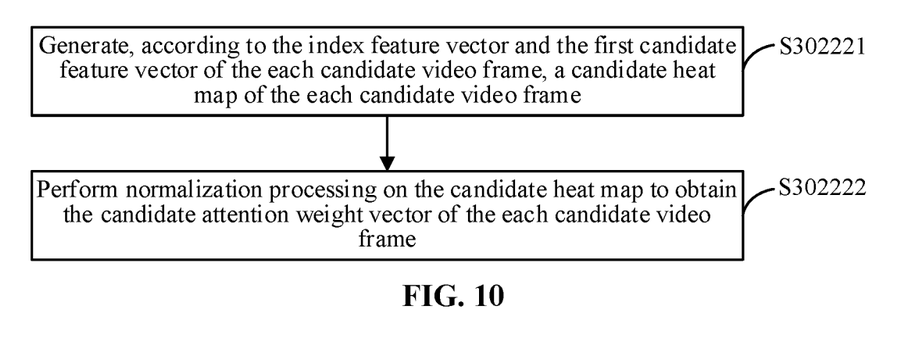
FIG. 10 is a schematic flowchart according to one or more embodiments of a pedestrian re-identification method according to embodiments of the present disclosure.

The attention weight vector is used for enhancing an effective pedestrian feature in an encoding process, is a weight vector having discrimination information, and can reduce the influence of noise information.

Operation S3024, an encoding result of the each target video segment and an encoding result of the each candidate video segment are obtained according to the attention weight vector, the second target feature vector, and the second candidate feature vector.

In the embodiments of the present disclosure, the second target feature vector is used for reflecting an image feature of each frame in the target video segment, and the second candidate feature vector is used for reflecting an image feature of each frame in the candidate video segment. In an optional implementation, for the target video frame, an encoding result of the each target video segment is obtained according to the target attention weight vector and the second target feature vector of the each target video frame. Specifically, the target attention weight vector of the each target video frame is multiplied by second target feature vectors of respective target video frames; and multiplication results of the each target video frame is added in time dimension, to obtain an encoding result of the each target video segment. For the candidate video frame, an encoding result of the each candidate video segment is obtained according to the candidate attention weight vector and the second candidate feature vector of the each candidate video frame. Optionally, the candidate attention weight vector of the each candidate video frame is multiplied by second candidate feature vectors of respective candidate video frames; and multiplication results of the each candidate video frame is added in time dimension, to obtain an encoding result of the each candidate video segment.

Figure 4:
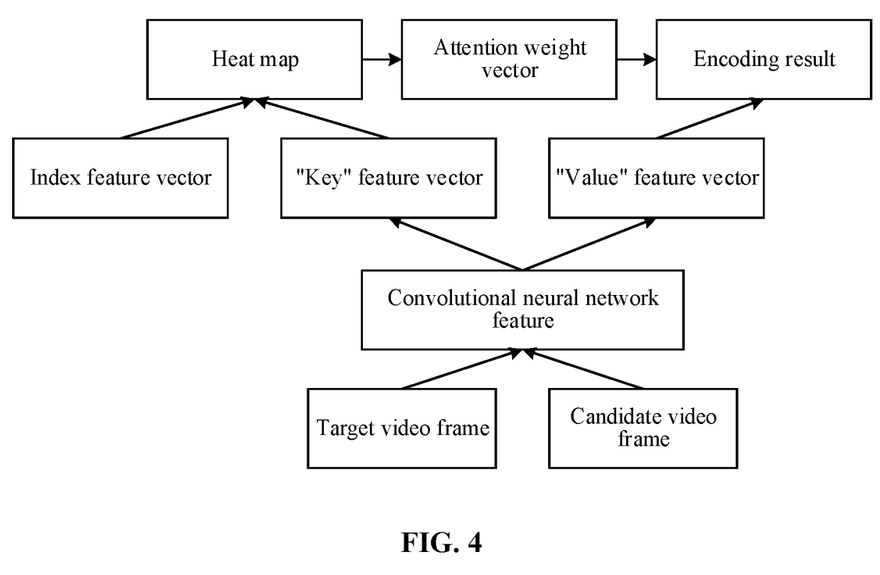
FIG. 4 is a schematic attention encoding mechanism diagram in a pedestrian re-identification method according to one or more embodiments of the present disclosure.

Operation S302 in the embodiments of the present disclosure may be implemented by an attention encoding mechanism diagram, i.e., by extracting features of different frames in a video segment (a target video segment and a candidate video segment), an encoding result of the video segment, and the process is as shown in FIG. 4. First, a convolutional neural network feature is extracted from each target video frame in a target video segment and each candidate video frame in a candidate video segment, a "key" feature vector and a "value" feature vector corresponding to the each target video frame or the each candidate video frame is generated according to the convolutional neural network feature, an inner product operation is performed on the "key" feature vector of the each target video frame or the each candidate video frame and an index feature vector of the each target video segment to form a heat map, and a correction between each feature in the target video frame or the candidate video frame and global information is reflected by means of the heat map. A normalization operation is performed on the heat map in time dimension by using a softmax function to form an attention weight vector, the attention weight vector is multiplied by the "value" feature vector of the each video frame in each dimension, and obtained results of different video frames are added in time dimension, so as to obtain an encoding result of the each video segment.

Operation S304, a score of similarity between the each target video segment and the each candidate video segment is determined according to encoding results.

In an optional implementation, a subtraction operation, a square operation, a full connection operation, and a normalization operation are performed on the encoding result of the each target video segment and the encoding result of the each candidate video segment in sequence, to obtain a score of similarity between the each target video segment and the each candidate video segment. Specifically, a subtraction operation is performed on the encoding result of the each target video segment and the encoding result of the each candidate video segment in sequence, and then a square operation is performed in each image dimension, where the image dimension includes, but is not limited to, a pedestrian image dimension and a background image dimension, where the pedestrian image dimension includes a head image dimension, an upper body image dimension, a lower body image dimension, and the like; and the background image dimension includes a building image dimension, a street image dimension, and the like. A feature vector obtained after the square operation passes through a full connection layer to obtain a two-dimensional feature vector, and finally, a score of similarity between the each target video segment and the each candidate video segment is obtained by means of a nonlinear normalization of a Sigmoid function. In one or more embodiments of the present disclosure, the performing a subtraction operation on the encoding result of the each target video segment and the encoding result of the each candidate video segment in sequence comprises: the encoding result of the each target video is subtracted by the encoding result of the each candidate video segment in sequence.

Operation S306, pedestrian re-identification is performed on the at least one candidate video according to the score of similarity.

In an optional implementation, for each of the at least one candidate video, scores of similarity greater than or equal to a preset threshold or high scores of similarity (for example, scores of similarity ranked top 20%) are added as a score of similarity of the each candidate video; the score of similarity of the each candidate video is ranked in descending order; and one or more candidate videos ranked top is determined as videos containing a same target pedestrian as the target video. The preset threshold may be set according to actual situations, and the high scores are relative.

According to the embodiments of the present disclosure, during pedestrian re-identification, a target video containing a target pedestrian and at least one candidate video are obtained; each target video segment in the target video and each candidate video segment in the at least one candidate segment are separately encoded; a score of similarity between the each target video segment and the each candidate video segment is determined according to encoding results; and pedestrian re-identification is performed on the at least one candidate video according to the score of similarity. A number of frames contained in a video segment are far less than a number of frames contained in an entire video, and therefore, a degree of change of pedestrian surface information in the video segment is far lower than a degree of change of pedestrian surface information in the entire video. Compared with encoding of an entire target video and an entire candidate video, encoding of each target video segment and each candidate video segment effectively reduces changes of pedestrian surface information, and a diversity of pedestrian surface information in different video frames and a dynamic correlation between a video frame and a video frame are used, so as to improve a utilization rate of the pedestrian surface information, and improve an accuracy rate of calculation of a score of similarity between the each target video segment and the each candidate video segment according to encoding results, thereby improving an accuracy rate of pedestrian re-identification.

The encoding result of the candidate video in the embodiments of the present disclosure is obtained by the index feature vector of the target video segment and the "key" feature vector of the candidate video segment. In an encoding process, the index feature vector of the target video segment is used as guidance information, there improving accuracy of determination of the score of similarity according to the encoding result of the candidate video. The attention weight vector of the each candidate video frame is estimated by using the index feature vector of the target video segment, so as to reduce the influence of an abnormal candidate video frame in the candidate video on the encoding result of the candidate video segment, thereby making re-identification of a pedestrian in the candidate video more targeted.

According to the embodiments of the present disclosure, a target video and a candidate video are segmented, a target video segment and a candidate video segment are encoded, and when a pedestrian in the candidate video is blocked by a part of the candidate video frame, a candidate video segment with a high score of similarity as an effective candidate video segment of the candidate video, and a candidate video segment with a low score of similarity is ignored.

Figure 5:
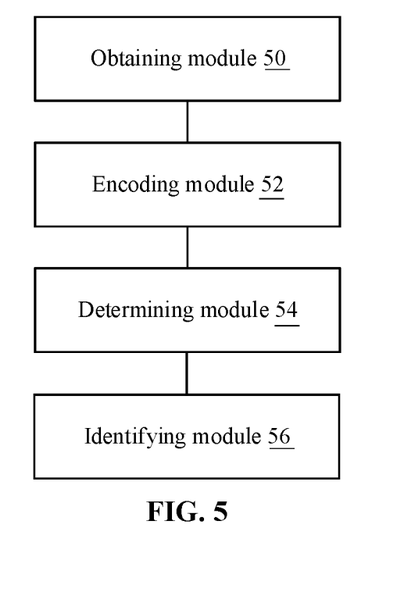
FIG. 5 is a schematic structural diagram of one embodiment of a pedestrian re-identification apparatus according to one or more embodiments of the present disclosure.

Referring to FIG. 5, a schematic structural diagram of one embodiment of a pedestrian re-identification apparatus according to embodiments of the present disclosure is shown.

The pedestrian re-identification apparatus provided in the embodiments of the present disclosure includes: an obtaining module 50, configured to obtain a target video containing a target pedestrian and at least one candidate video; an encoding module 52, configured to encode each target video segment in the target video and each candidate video segment in the at least one candidate segment separately; a determining module 54, configured to determine a score of similarity between the each target video segment and the each candidate video segment according to encoding results, the score of similarity being used for representing a degree of similarity between pedestrian features in the target video segment and the candidate video segment; and an identification module 56, configured to perform pedestrian re-identification on the at least one candidate video according to the score of similarity.

The pedestrian re-identification apparatus according to the embodiments of the present disclosure is configured to implement the corresponding pedestrian re-identification method according to the forgoing embodiments, and has beneficial effects of the corresponding method embodiments. Details are not described herein repeatedly.

Figure 6:
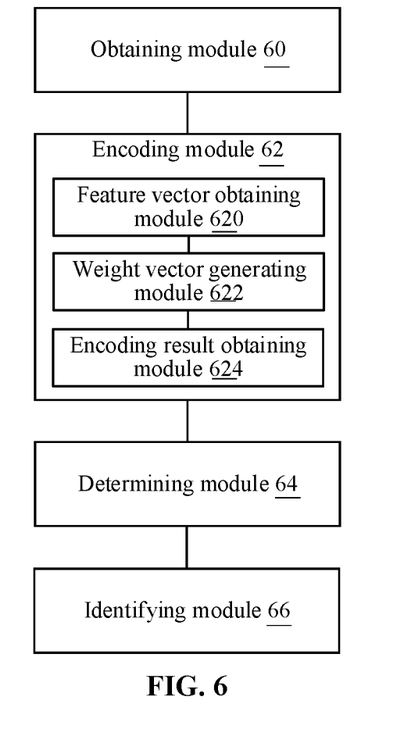
FIG. 6 is a schematic structural diagram of another embodiment of a pedestrian re-identification apparatus according to one or more embodiments of the present disclosure.

Referring to FIG. 6, a schematic structural diagram of another embodiment of a pedestrian re-identification apparatus according to embodiments of the present disclosure is shown.

The pedestrian re-identification apparatus provided in the embodiments of the present disclosure includes: an obtaining module 60, configured to obtain a target video containing a target pedestrian and at least one candidate video; an encoding module 62, configured to encode each target video segment in the target video and each candidate video segment in the at least one candidate segment separately; a determining module 64, configured to determine a score of similarity between the each target video segment and the each candidate video segment according to encoding results, the score of similarity being used for representing a degree of similarity between pedestrian features in the target video segment and the candidate video segment; and an identification module 66, configured to perform pedestrian re-identification on the at least one candidate video according to the score of similarity.

Optionally, the encoding module 62 includes: a feature vector obtaining module 620, configured to obtain a first target feature vector and a second target feature vector of each target video frame in the each target video segment as well as an index feature vector of the each target video segment, and obtain a first candidate feature vector and a second candidate feature vector of each candidate video frame in the each candidate video segment; a weight vector generating module 622, configured to generate an attention weight vector according to the index feature vector, the first target feature vector, and the first candidate feature vector; and an encoding result obtaining module 624, configured to obtain an encoding result of the each target video segment and an encoding result of the each candidate video segment according to the attention weight vector, the second target feature vector, and the second candidate feature vector.

Optionally, the feature vector obtaining module 620 is configured to extract an image feature vector of the each target video frame and an image feature vector of the each candidate video frame separately; and generate a first target feature vector and a second target feature vector of the each target video frame as well as an index feature vector of the each target video frame according to the image feature vector of the each target video frame, and generate a first candidate feature vector and a second candidate feature vector of the each candidate video frame according to the image feature vector of the each candidate video frame.

Optionally, the attention weight vector comprises a target attention weight vector and a candidate attention weight vector. The weight vector generating module 622 is configured to generate a target attention weight vector of the each target video frame according to the index feature vector and the first target feature vector, and generate a candidate attention weight vector of the each candidate video frame according to the index feature vector and the first candidate feature vector.

Optionally, the weight vector generating module 622 is configured to generate a target heat map of the each target video frame according to the index feature vector and the first target feature vector of the each target video frame; and perform normalization processing on the target heat map to obtain a target attention weight vector of the each target video frame; and/or generate a candidate heat map of the each candidate video frame according to the index feature vector and the first candidate feature vector of the each candidate video frame; and perform normalization processing on the candidate heat map to obtain a candidate attention weight vector of the each candidate video frame.

Optionally, the encoding result obtaining module 624 is configured to obtain an encoding result of the each target video segment according to the target attention weight vector and the second target feature vector of the each target video frame, and obtain an encoding result of the each candidate video segment according to the candidate attention weight vector and the second candidate feature vector of the each candidate video frame.

Optionally, the encoding result obtaining module 624 is configured to multiply the target attention weight vector of the each target video frame by second target feature vectors of respective target video frames; and add multiplication results of the each target video frame in time dimension, to obtain an encoding result of the each target video segment; and/or multiply the candidate attention weight vector of the each candidate video frame by second candidate feature vectors of respective candidate video frames; and add multiplication results of the each candidate video frame in time dimension, to obtain an encoding result of the each candidate video segment.

Optionally, the determining module 64 is configured to perform a subtraction operation on the encoding result of the each target video frame and the encoding result of the each candidate video segment in sequence; perform a square operation on a subtraction operation result in each dimension; perform a full connection operation on a feature vector obtained by the square operation to obtain a two-dimensional feature vector; and perform a normalization operation on the two-dimensional feature vector, to obtain a score of similarity between the each target video segment and the each candidate video segment.

Optionally, the identifying module 66 is configured to, for each candidate video in the at least one candidate video, take a sum of a preset proportion of top scores in scores of similarity between each candidate video segment of the candidate video and the each target video segment as a score of similarity of the candidate video; rank the score of similarity of the each candidate video in descending order; and determine one or several candidate videos ranked top as videos containing a same target pedestrian as the target video.

The pedestrian re-identification apparatus according to the embodiments of the present disclosure is configured to implement the corresponding pedestrian re-identification method according to the forgoing embodiments, and has beneficial effects of the corresponding method embodiments. Details are not described herein repeatedly.

Figure 7:
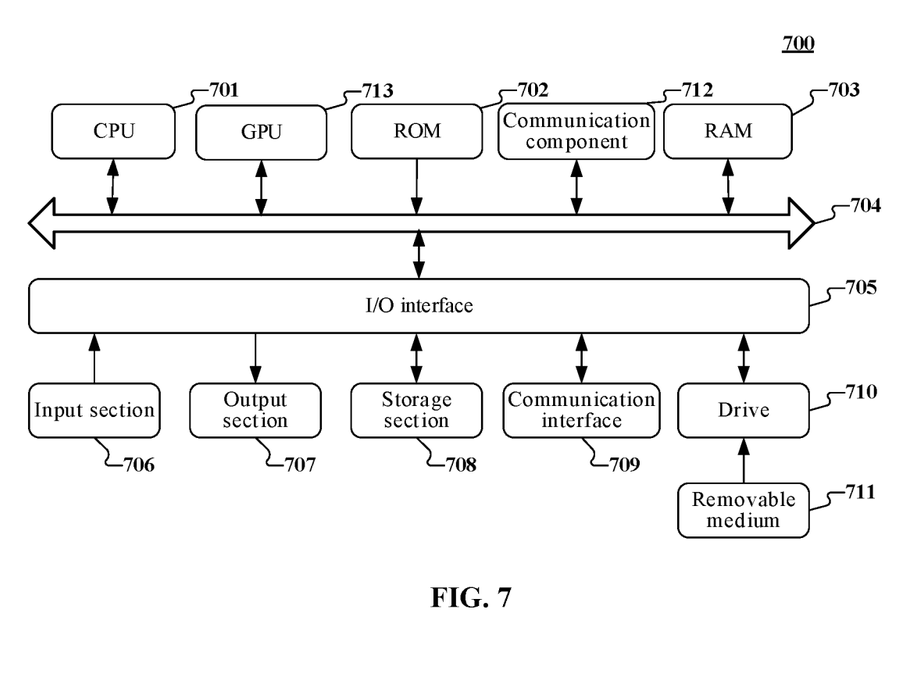
FIG. 7 is a schematic structural diagram of one embodiment of an electronic device according to one or more embodiments of the present disclosure.

The embodiments of the present disclosure further provide an electronic device which, for example, is a mobile terminal, a Personal Computer (PC), a tablet computer, a server, or the like. Referring to FIG. 7 below, a schematic structural diagram of an electronic device 700 suitable for implementing the pedestrian re-identification apparatus according to the embodiments of the present disclosure is shown. As shown in FIG. 7, the electronic device 700 may include a memory and a processor. Specifically, the electronic device 700 includes one or more processors, a communication element, and the like. The one or more processors are, for example, one or more Central Processing Units (CPUs) 701, and/or one or more Graphic Processing Units (GPUs) 713, or the like, and the processors execute various appropriate actions and processing according to executable instructions stored in a Read-Only Memory (ROM) 702 or executable instructions loaded from a storage section 708 to a Random Access Memory (RAM) 703. The communication element includes a communication component 712 and/or a communication interface 709. The communication component 712 includes, but is not limited to, a network card, and the network card includes, but is not limited to, an Infini-Band (IB) network card. The communication interface 709 includes a communication interface of a network interface card such as a Local Area Network (LAN) card and a modem, and the communication interface 709 performs communication processing via a network such as the Internet.

The processor may communicate with the ROM 702 and/or the RAM 703 to execute executable instructions, is connected to the communication component 712 via a communication bus 704, and communicates with other target devices via the communication component 712, so as to achieve corresponding operations of any pedestrian re-identification method provided in the embodiments of the present disclosure, for example, obtaining a target video containing a target pedestrian and at least one candidate video; encoding each target video segment in the target video and each candidate video segment in the at least one candidate segment separately; determining a score of similarity between the each target video segment and the each candidate video segment according to encoding results, the score of similarity being used for representing a degree of similarity between pedestrian features in the target video segment and the candidate video segment; and performing pedestrian re-identification on the at least one candidate video according to the score of similarity.

In addition, the RAM 703 may further store various programs and data required for operations of an apparatus. The CPU 701 or GPU 713, the ROM 702, and the RAM 703 are connected to each other by means of the communication bus 704. In the presence of the RAM 703, the ROM 702 is an optional module. The RAM 703 stores executable instructions, or writes the executable instructions to the ROM 702 during running, where the executable instructions cause the processor to perform corresponding operations of the foregoing communication method. An Input/output (I/O) interface 705 is also connected to the communication bus 704. The communication component 712 is integrated, or is configured to have plurality of sub-modules (e.g., plurality of IB network cards) linked on the communication bus.

The following components are connected to the I/O interface 705: an input section 706 including a keyboard, a mouse and the like; an output section 707 including a Cathode-Ray Tube (CRT), a Liquid Crystal Display (LCD), a loudspeaker and the like; a storage section 708 including hardware and the like; and the communication interface 709 of a network interface card such as an LAN card and a modem. A drive 710 is also connected to the I/O interface 705 according to requirements. A removable medium 711 such as a magnetic disk, an optical disk, a magneto-optical disk, a semiconductor memory or the like is installed on the drive 710 according to requirements, so that a computer program read from the removable medium is installed on the storage section 708 according to requirements.

It should be noted that the architecture illustrated in FIG. 7 is merely an optional implementation. During specific practice, the number and types of the components in FIG. 7 may be selected, decreased, increased, or replaced according to actual requirements. Different functional components may be separated or integrated or the like. For example, the GPU and the CPU may be separated, or the GPU may be integrated on the CPU, and the communication element may be separated from or integrated on the CPU or the GPU or the like. These alternative implementations all fall within the scope of protection of the present invention.

The electronic device according to the embodiments of the present disclosure can be configured to implement the corresponding pedestrian re-identification method in the foregoing embodiments. The components in the electronic device may be configured to perform the operations in the foregoing method embodiments. For example, the pedestrian re-identification method described above may be implemented by the processor of the electronic device invoking related instructions stored in the memory. For the purpose of concision, details are not described herein repeatedly.

The process described above with reference to the flowchart according to the embodiments of the present disclosure may be implemented as a computer software program. For example, the embodiments of the present disclosure include a computer program product, including a computer program tangibly included on a machine-readable medium. The computer program includes a program code for performing the method shown in the flowchart. The program code may include corresponding instructions for performing the operations of the method provided in the embodiments of the present disclosure, for example, obtaining a target video containing a target pedestrian and at least one candidate video; encoding each target video segment in the target video and each candidate video segment in the at least one candidate segment separately; determining a score of similarity between the each target video segment and the each candidate video segment according to encoding results, the score of similarity being used for representing a degree of similarity between pedestrian features in the target video segment and the candidate video segment; and performing pedestrian re-identification on the at least one candidate video according to the score of similarity. In such embodiments, the computer program may be downloaded and installed from a network through the communication element and/or installed from the removable medium 711. When the computer program is executed by the processor, functions provided in the method according to the embodiments of the present disclosure are performed.

The methods, apparatuses, electronic devices, and storage media according to the embodiments of the present disclosure may be implemented in many manners. For example, the methods, apparatuses, electronic devices, and storage media according to the embodiments of the present disclosure may be implemented by using software, hardware, firmware, or any combination of software, hardware, and firmware. Unless otherwise specially stated, the foregoing sequences of operations of the methods are merely for description, and are not intended to limit the operations of the methods of the embodiments of the present disclosure. In addition, in some embodiments, the present disclosure may be implemented as programs recorded in a recording medium. The programs include machine-readable instructions for implementing the methods according to the embodiments of the present disclosure. Therefore, the present disclosure further covers the recording medium storing the programs for performing the methods according to the embodiments of the present disclosure.

The descriptions of the embodiments of the present disclosure are provided for the purpose of examples and description, and are not intended to be exhaustive or limit the present invention to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A pedestrian re-identification method, comprising:
obtaining at least one candidate video and a target video containing a target pedestrian;
encoding each target video segment in the target video and each candidate video segment in the at least one candidate segment respectively;
determining, according to encoding results, a score of similarity between the each target video segment and the each candidate video segment, the score of similarity being used for representing a degree of similarity between pedestrian features in the target video segment and pedestrian features in the candidate video segment; and
performing, according to the score of similarity, pedestrian re-identification on the at least one candidate video,
wherein the determining, according to encoding results, a score of similarity between the each target video segment and the each candidate video segment comprises:
performing a subtraction operation on an encoding result of the each target video segment and an encoding result of the each candidate video segment in sequence;
performing, in each dimension, a square operation on a result of the subtraction operation;
performing a full connection operation on a feature vector obtained by the square operation to obtain a two-dimensional feature vector;
performing a normalization operation on the two-dimensional feature vector; and
obtaining the score of similarity between the each target video segment and the each candidate video segment.

2. The method according to claim 1, wherein the encoding each target video segment in the target video and each candidate video segment in the at least one candidate segment respectively comprises:
obtaining a first target feature vector and a second target feature vector of each target video frame in the each target video segment as well as an index feature vector of the each target video segment;
obtaining a first candidate feature vector and a second candidate feature vector of each candidate video frame in the each candidate video segment;
generating, according to the index feature vector, the first target feature vector, and the first candidate feature vector, an attention weight vector; and
obtaining, according to the attention weight vector, the second target feature vector, and the second candidate feature vector, an encoding result of the each target video segment and an encoding result of the each candidate video segment.

3. The method according to claim 2, wherein the obtaining a first target feature vector and a second target feature vector of each target video frame in the each target video segment as well as an index feature vector of the each target video segment, and obtaining a first candidate feature vector and a second candidate feature vector of each candidate video frame in the each candidate video segment comprises:
extracting an image feature vector of the each target video frame and an image feature vector of the each candidate video frame respectively;
generating, according to the image feature vector of the each target video frame, the first target feature vector and the second target feature vector of the each target video frame as well as the index feature vector of the each target video frame; and
generating, according to the image feature vector of the each candidate video frame, the first candidate feature vector and the second candidate feature vector of the each candidate video frame.

4. The method according to claim 2, wherein the attention weight vector comprises a target attention weight vector and a candidate attention weight vector, wherein the generating, according to the index feature vector, the first target feature vector, and the first candidate feature vector, an attention weight vector comprises:
generating, according to the index feature vector and the first target feature vector, a target attention weight vector of the each target video frame; and
generating, according to the index feature vector and the first candidate feature vector, a candidate attention weight vector of the each candidate video frame.

5. The method according to claim 4, wherein the generating, according to the index feature vector and the first target feature vector, a target attention weight vector of the each target video frame comprises:
generating, according to the index feature vector and the first target feature vector of the each target video frame, a target heat map of the each target video frame; and performing normalization processing on the target heat map to obtain the target attention weight vector of the each target video frame;

and/or the generating, according to the index feature vector and the first candidate feature vector, a candidate attention weight vector of the each candidate video frame comprises:

generating, according to the index feature vector and the first candidate feature vector of the each candidate video frame, a candidate heat map of the each candidate video frame; and performing normalization processing on the candidate heat map to obtain the candidate attention weight vector of the each candidate video frame, wherein a heat map is formed by performing an inner product operation on a key feature vector of the each target video frame or the each candidate video frame and the index feature vector of the each target video segment, and the heat map is used for reflecting a correction between each feature in the target video frame or the candidate video frame and global information.

6. The method according to claim 2, wherein the obtaining, according to the attention weight vector, the second target feature vector, and the second candidate feature vector, an encoding result of the each target video segment and an encoding result of the each candidate video segment comprises:

obtaining, according to the target attention weight vector and the second target feature vector of the target video frame, the encoding result of the each target video segment; and obtaining, according to the candidate attention weight vector and the second candidate feature vector of the candidate video frame, the encoding result of the each candidate video segment.

7. The method according to claim 6, wherein the obtaining, according to the target attention weight vector and the second target feature vector of the each target video frame, the encoding result of the each target video segment comprises:

multiplying the target attention weight vector of the each target video frame by the second target feature vector of the each target video frame;

adding, in time dimension, multiplication result of the each target video frame; and obtain the encoding result of the each target video segment;

and/or the obtaining, according to the candidate attention weight vector and the second candidate feature vector of the each candidate video frame, the encoding result of the each candidate video segment comprises:

multiplying the candidate attention weight vector of the each candidate video frame by the second candidate feature vector of the each candidate video frame;

adding, in time dimension, multiplication result of the each candidate video frame; and obtaining the encoding result of the each candidate video segment.

8. The method according to claim 1, wherein the performing, according to the score of similarity, pedestrian re-identification on the at least one candidate video comprises:

for each candidate video in the at least one candidate video, taking a sum of a preset proportion of top scores in scores of similarity between each candidate video segment of the candidate video and the each target video segment as a score of similarity of the candidate video;

ranking the score of similarity of the each candidate video in a descending order; and determining one or several candidate videos ranked top as videos containing a same target pedestrian as the target video.

9. An electronic device, comprising:

a processor; and a memory for storing instructions executable by the processor;

wherein execution of the instructions by the processor causes the processor to perform the following operations:

obtaining at least one candidate video and a target video containing a target pedestrian;

encoding each target video segment in the target video and each candidate video segment in the at least one candidate segment respectively;

determining, according to encoding results, a score of similarity between the each target video segment and the each candidate video segment, the score of similarity being used for representing a degree of similarity between pedestrian features in the target video segment and pedestrian features in the candidate video segment; and performing, according to the score of similarity, pedestrian re-identification on the at least one candidate video, wherein the determining, according to encoding results, a score of similarity between the each target video segment and the each candidate video segment comprises:

performing a subtraction operation on an encoding result of the each target video segment and an encoding result of the each candidate video segment in sequence;

performing, in each dimension, a square operation on a result of the subtraction operation;

performing a full connection operation on a feature vector obtained by the square operation to obtain a two-dimensional feature vector;

performing a normalization operation on the two-dimensional feature vector; and obtaining the score of similarity between the each target video segment and the each candidate video segment.

10. The electronic device according to claim 9, wherein the encoding each target video segment in the target video and each candidate video segment in the at least one candidate segment respectively comprises:

obtaining a first target feature vector and a second target feature vector of each target video frame in the each target video segment as well as an index feature vector of the each target video segment;

obtaining a first candidate feature vector and a second candidate feature vector of each candidate video frame in the each candidate video segment;

generating, according to the index feature vector, the first target feature vector, and the first candidate feature vector, an attention weight vector; and obtaining, according to the attention weight vector, the second target feature vector, and the second candidate feature vector, an encoding result of the each target video segment and an encoding result of the each candidate video segment.

11. The electronic device according to claim 10, wherein the obtaining a first target feature vector and a second target feature vector of each target video frame in the each target video segment as well as an index feature vector of the each target video segment, and obtaining a first candidate feature vector and a second candidate feature vector of each candidate video frame in the each candidate video segment comprises:

extracting an image feature vector of the each target video frame and an image feature vector of the each candidate video frame respectively;

generating, according to the image feature vector of the each target video frame, the first target feature vector and the second target feature vector of the each target video frame as well as the index feature vector of the each target video frame; and     generating, according to the image feature vector of the each candidate video frame, the first candidate feature vector and the second candidate feature vector of the each candidate video frame.

12. The electronic device according to claim 10, wherein the attention weight vector comprises a target attention weight vector and a candidate attention weight vector, wherein the generating, according to the index feature vector, the first target feature vector, and the first candidate feature vector, an attention weight vector comprises:

generating, according to the index feature vector and the first target feature vector, a target attention weight vector of the target video frame; and     generating, according to the index feature vector and the first candidate feature vector, a candidate attention weight vector of the each candidate video frame.

13. The electronic device according to claim 12, wherein the generating, according to the index feature vector and the first target feature vector, a target attention weight vector of the each target video frame comprises:

generating, according to the index feature vector and the first target feature vector of the each target video frame, a target heat map of the each target video frame; and     performing normalization processing on the target heat map to obtain the target attention weight vector of the each target video frame;

and/or the generating, according to the index feature vector and the first candidate feature vector, a candidate attention weight vector of the each candidate video frame comprises:

generating, according to the index feature vector and the first candidate feature vector of the each candidate video frame, a candidate heat map of the each candidate video frame; and     performing normalization processing on the candidate heat map to obtain the candidate attention weight vector of the each candidate video frame,     wherein a heat map is formed by performing an inner product operation on a key feature vector of the each target video frame or the each candidate video frame and the index feature vector of the each target video segment, and the heat map is used for reflecting a correction between each feature in the target video frame or the candidate video frame and global information.

14. The electronic device according to claim 10, wherein the obtaining, according to the attention weight vector, the second target feature vector, and the second candidate feature vector, an encoding result of the each target video segment and an encoding result of the each candidate video segment comprises:

obtaining, according to the target attention weight vector and the second target feature vector of the target video frame, the encoding result of the each target video segment; and     obtaining, according to the candidate attention weight vector and the second candidate feature vector of the candidate video frame, the encoding result of the each candidate video segment.

15. The electronic device according to claim 14, wherein the obtaining, according to the target attention weight vector and the second target feature vector of the each target video frame, the encoding result of the each target video segment comprises:

multiplying the target attention weight vector of the each target video frame by the second target feature vector of the each target video frame;

adding, in time dimension, multiplication result of the each target video frame; and     obtain the encoding result of the each target video segment;

and/or the obtaining, according to the candidate attention weight vector and the second candidate feature vector of the each candidate video frame, the encoding result of the each candidate video segment comprises:

multiplying the candidate attention weight vector of the each candidate video frame by the second candidate feature vector of the each candidate video frame;

adding, in time dimension, multiplication result of the each candidate video frame; and     obtaining the encoding result of the each candidate video segment.

16. The electronic device according to claim 9, wherein the performing, according to the score of similarity, pedestrian re-identification on the at least one candidate video comprises:

for each candidate video in the at least one candidate video, taking a sum of a preset proportion of top scores in scores of similarity between each candidate video segment of the candidate video and the each target video segment as a score of similarity of the candidate video;

ranking the score of similarity of the each candidate video in a descending order; and     determining one or several candidate videos ranked top as videos containing a same target pedestrian as the target video.

17. A non-transitory computer-readable storage medium, configured to store computer-readable instructions, wherein execution of the instructions by the processor causes the processor to perform the following operations:

obtaining at least one candidate video and a target video containing a target pedestrian;

encoding each target video segment in the target video and each candidate video segment in the at least one candidate segment respectively;

determining, according to encoding results, a score of similarity between the each target video segment and the each candidate video segment, the score of similarity being used for representing a degree of similarity between pedestrian features in the target video segment and pedestrian features in the candidate video segment; and     performing, according to the score of similarity, pedestrian re-identification on the at least one candidate video, wherein the determining, according to encoding results, a score of similarity between the each target video segment and the each candidate video segment comprises:

performing a subtraction operation on an encoding result of the each target video segment and an encoding result of the each candidate video segment in sequence;

performing, in each dimension, a square operation on a result of the subtraction operation;

performing a full connection operation on a feature vector obtained by the square operation to obtain a two-dimensional feature vector;

performing a normalization operation on the two-dimensional feature vector; and obtaining the score of similarity between the each target video segment and the each candidate video segment.

18. The non-transitory computer-readable storage medium according to claim 17, wherein the encoding each target video segment in the target video and each candidate video segment in the at least one candidate segment respectively comprises:

obtaining a first target feature vector and a second target feature vector of each target video frame in the each target video segment as well as an index feature vector of the each target video segment;

obtaining a first candidate feature vector and a second candidate feature vector of each candidate video frame in the each candidate video segment;

generating, according to the index feature vector, the first target feature vector, and the first candidate feature vector, an attention weight vector; and obtaining, according to the attention weight vector, the second target feature vector, and the second candidate feature vector, an encoding result of the each target video segment and an encoding result of the each candidate video segment.

* * * * *